Aug. 10, 1926.
T. J. STUMP
1,595,584
WEEDING AND PRUNING INSTRUMENT
Filed August 18, 1925
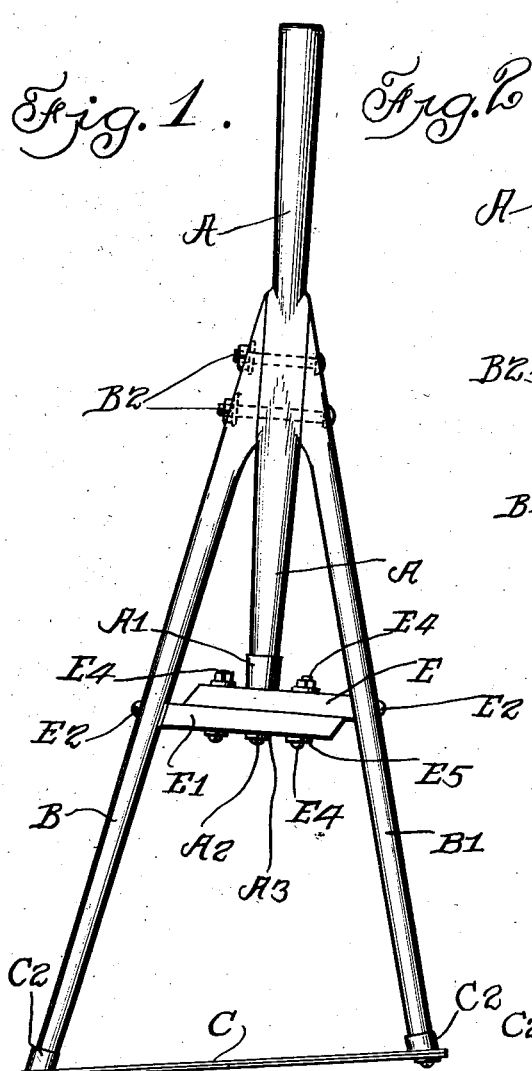
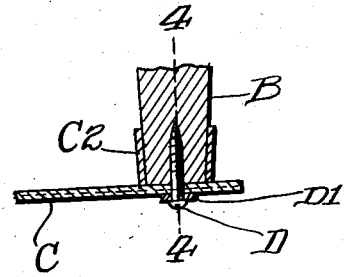
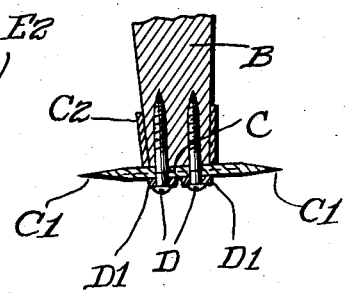
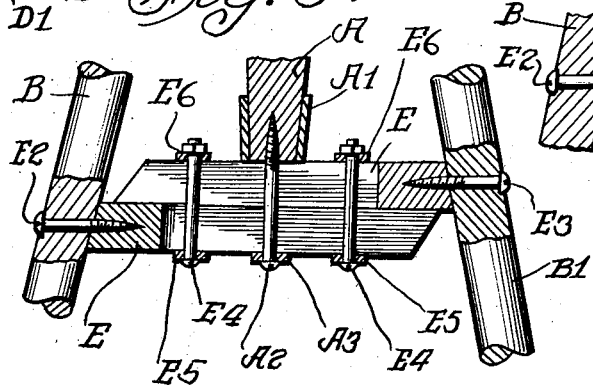
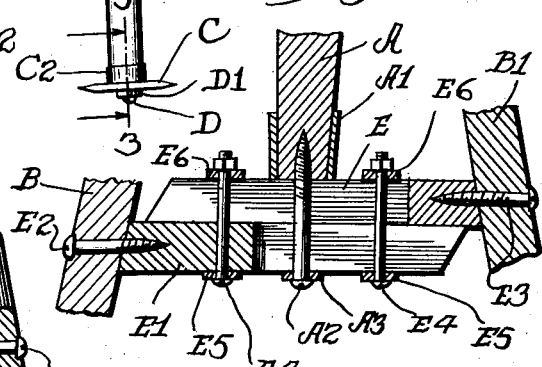
INVENTOR
Thomas J. Stump
BY Cyrus Kehr
ATTORNEY Patented Aug. 10, 1926.

1,595,584

UNITED STATES PATENT OFFICE.

THOMAS J. STUMP, OF ASHLAND CITY, TENNESSEE.

WEEDING AND PRUNING INSTRUMENT.

Application filed August 18, 1925. Serial No. 51,069.

This invention relates to hand instruments used for cutting weeds and grass and small shrubbery and vines and for pruning shrubs and trees.

The object of the invention is to produce such an instrument in simple form and having a blade well adapted to perform work of the kinds mentioned.

In the accompanying drawings,

Fig. 1 is a side elevation of an instrument embodying my invention;

Fig. 2 is a view looking at the instrument from the left as shown in Fig. 1;

Fig. 3 is a section on the line, 3—3, of Fig. 2;

Fig. 4 is a section on the line, 4—4, of Fig. 3, illustrating a modification;

Fig. 5 is a section on the line, 5—5, of Fig. 2, looking toward the right;

Fig. 6 is a view similar to Fig. 5, the structure being slightly modified.

Referring to said drawings, A is a wooden handle. B is a wooden arm. $B^1$ is the other wooden arm. This is preferably shorter than the arm, B, as shown in Fig. 1. The upper ends of these arms are secured to approximately the middle of the handle by bolts, $B^2$, extending transversely through the arms and the handle. The arms are preferably flexible and they diverge as shown by Fig. 1, to separate the lower ends a distance equalling the length of the blade, C, which has its ends joined to the lower ends of the arms. The blade, C, is of a good quality of metal and has its side edges, $C^1$, formed for cutting. A width of an inch or an inch and a quarter will answer for this blade. The lower end of each arm, B and $B^1$, is surrounded by a sleeve or ferrule, $C^2$. The lower end of each arm and each ferrule is slanted cross-wise to meet the horizontal face of the blade. At each end of the blade, one or more screws, D, extend upward through a washer and the blade and into the adjacent arm. Thus the ends of the blade are firmly attached to the ends of the arms. Fig. 4, shows two such screws placed side-by-side. Other figures shown only one such screw.

The blade is thin and flexible and is placed under tension by the arms, B and $B^1$. To produce and maintain tension, spreading members, E and $E^1$, are applied to the lower end of the handle, A, and to the arms, B and $B^1$. These spreading members over-lap each other and may be moved upon each other for adjustment of the tension. The left hand end of the member, $E^1$, bears against the arm, B. A screw, $E^2$, extends horizontally through the arm, B, and into the member, $B^1$, whereby said member is firmly bound to the arm, B. The right hand end of the member, E, bears against the arm, $B^1$, and a screw, $E^3$, extends horizontally through the arm, $B^1$, and into the member, E, and binds said member firmly to said arm. In Fig. 5, the member, E, bears against the lower end of the handle, A, and the ferrule, $A^1$, which surrounds the lower end of the handle. From near the inner end of the screw, $E^3$, the member, E, is slotted to its free end in an upright plane. The member, E, is similarly slotted from near the inner end of the screw, $E^2$, in the same upright plane. A screw, $A^2$, extends upward through a washer, $A^3$, and through the slots in the members, E and $E^1$, and into the lower end of the handle, A. By driving that screw upward, the members, E and $E^1$, are pressed against each other and the member, E, is bound against the handle, A, and the ferrule, $A^1$. At each side of the screw, $A^2$, a small bolt, $E^4$, extends through a washer, $E^5$, and the slots in the members, E and $E^1$, and a washer, $E^6$, resting on the upper face of the member, E. By tightening these bolts, the members, E and $E^1$, are still further bound to each other. When these bolts and the screw, $A^2$, have been loosened, the arms, B and $B^1$, may be forced apart adjacent these spreading members, whereby the tension on the blade, C, is increased. Then said bolts and the screw, $A^2$, are again made tight to hold the spreading members, E and $E^1$, in the new position.

In Fig. 6, the spreading members are formed and arranged the same as in Fig. 5, excepting that the slot of the member, $E^1$, begins between the left hand bolt, $E^4$, and the screw, $A^2$, whereby the lower part of the bolt, $E^4$, is seated in solid wood.

It will be observed that these spreading members are placed high enough to form an open space above the blade for the passing of grass and weeds and parts of shrubs and trees cut off while pruning. This space is desirable.

In addition to serving for spreading, the members, E and $E^1$, serve as a means for securing the lower end of the handle, A, whereby the handle is given a second attachment, which lends stability. At the same time these spreading members connect the arms, B and B¹, with the handle, whereby the arms are given a second attachment to the handle. This lends stability to the arms, irrespective of the spreading function.

One of the arms is preferably made longer than the other, in order that the lower part of the instrument (the blade, C,) may be in the horizontal while the remainder of the instrument leans. This allows the operator to cut with the blade parallel to the ground without it being necessary for him to lean uncomfortably far forward to hold the instrument in the upright position.

The blade is preferably provided with the two cutting edges, C¹, C¹, as above described, in order that the operator may cut by swinging the instrument in either direction.

It may be said that the handle and the arms and the spreading members together constitute a frame for holding the cutting blade, C, the frame being adjustable for applying tension to the cutting blade.

The adjusting of the spreading members may be facilitated by first easing the bolts, B², which secure the arms to the handle. This allows easy spreading of the arms at the spreading members. When the spreading members have been adjusted and again secured to each other by their bolts and screw, the bolts, B², are to be again tightened, whereby the adjacent ends of the arms are again drawn against the handle. That gives the arms a tilting movement tending to separate their lower ends. Thereby the cutting blade is put under more tension.

It is to be observed that the cutting blade is so shaped and so supported as to adapt it to be held slanting relative to the course of the stroke made for cutting, whereby the blade makes a slanting or shaving cut. This movement is best suited for effective cutting.

Furthermore, the two cutting edges and the shape of the blade and the manner of supporting it adapt the instrument for cutting in two directions. For example, if the instrument is swung toward the left for cutting grass or weeds, it may also be made to cut while being swung back toward the right, the cutting being equally effective in both directions.

I claim as my invention,

1. In an instrument of the kind described, the combination of a cutting blade, a handle, two arms placed at opposite sides of the handle and each having one end secured to the handle between the ends of the handle, and spreading means located between the handles and secured thereto and to the lower end of the handle, substantially as described.

2. In an instrument of the kind described, the combination of a cutting blade, a handle, two arms placed at opposite sides of the handle and each having one end secured to the handle between the ends of the handle, and spreading means located between the handles and secured thereto and to the lower end of the handle and comprising a plurality of members movable relatively to each other, substantially as described.

3. In an instrument of the kind described, the combination of a cutting blade, a handle, two arms placed at opposite sides of the handle and each having one end secured to the handle between the ends of the handle, spreading located between the handles and comprising two over-lapping members movable upon each other and secured to the arms, and means for securing said members to each other, substantially as described.

4. In an instrument of the kind described, the combination of a cutting blade, a handle, two arms placed at opposite sides of the handle and each having one end secured to the handle between the ends of the handle, spreading means secured between the handles and comprising two over-lapping members movable upon each other, and means for securing the spreading means to the arms and to the lower end of the handle, substantially as described.

5. In an instrument of the kind described, the combination of a cutting blade, a handle, two arms placed at opposite sides of the handle and each having one end secured to the handle between the ends of the handle, spreading means located between the handles and comprising two over-lapping and slotted members, and means for securing said members to each other and to the arms, substantially as described.

6. In an instrument of the kind described, the combination of a cutting blade, a handle, two arms placed at opposite sides of the handle and each having one end secured to the handle between the ends of the handle, spreading means located between the handles and comprising two over-lapping and slotted members, and means for securing said members to each other and to the arms and to the handle, substantially as described.

In testimony whereof I have signed my name, this 15th day of August, in the year one thousand nine hundred and twenty-five.

THOMAS J. STUMP.